INVENTORS
EDMUND SANDBORN
ALFRED AZZOPARDI

Cushman, Darby and Cushman
ATTORNEYS 3,531,863
STENCIL CUTTERS
Edmund Sandborn, Beaconsfield, Quebec, and Alfred Azzopardi, Ville St. Laurent, Quebec, Canada, assignors to S.K.S. Ltd., Montreal, Quebec, Canada, a corporation of Canada
Filed Feb. 13, 1968, Ser. No. 705,058
Int. Cl. B26f 1/14
U.S. Cl. 30—301     6 Claims

ABSTRACT OF THE DISCLOSURE

Stencil cutters formed from acrylic, nylon, fibreglass reinforced nylon or other polymers and having lateral edges stepped to provide abutment surfaces to contact similar abutment surfaces of immediately adjacent cutters to positon properly such cutters, said lateral edges being stepped in accordance with the shape of the letter on each said cutter.

---

The present invention relates to stencil cutters for cutting stencils used primarily in the engraving of stone, metal or the like. More particularly, the present invention relates to stencil cutters formed from plastic and shaped to space the letters automatically and accurately regardless of the combination of letters selected.

Many different cutter forms for stencil cutting have been proposed, the majority being made of metal with only a few plastic letters being available. Metal letters are relatively expensive and require special means for positioning same. These letters are generally made of relatively soft metals such as bronze or aluminum and thus are difficult to keep sharp. Plastic letters heretofore have not stood up to everyday use wherein they are subjected to pressure during the cutting of a stencil. Cracking of the letters in the press and breaking or dulling of the cutting edges are common defects with plastic letters. When the letters become dull more pressure is required to cut the material; this increases the stresses applied to the letters and results in breakage of the letters in use. Such breakage may also ruin the stencil and require preparation of a new stencil.

Applicant has been able to overcome these defects in the letters of the prior art and has discovered that letters formed from specific plastic materials will stand up much better under normal use than did the earlier plastic letters. Also, applicant's letters are made with very specifically shapd lateral edges which edges cooperate by abutment with the lateral edges of immediately adjacent letters to space automatically properly the letters in side-by-side relationship. Also, applicant has found that by selecting a very specific angle for the cutting edges defining the outline of the letters, much more efficient cutting of the stencil can be obtained and the life of the cutting edges, and thus the letters, is extended.

Broadly, the present invention comprises a stencil cutting form molded from an acrylic, nylon or fibreglass reinforced polymer and having stepped lateral edges, said lateral edges being stepped in relation to the shape of the letter on said form to provide laterally and vertically spaced abutment surfaces which co-operate with similar surfaces on adjacent letters to space properly, laterally, the letters.

Further features, objects and advantages will be evident from the following detailed description taken in conjunction with the accompanying drawings in which.

Before describing the shape of the various letters in detail the material from which the letters are formed by molding will be described. Many different plastic materials were considered and tried before a material having the required physical and chemical characteristics to function as stencil cutters was discovered. Such materials must of necessity be able to withstand the various forces of pressure and shear to which the letters are subjected during the cutting operation. Also the material must be such that it can be formed easily into the desired shapes preferably by molding. After many trials and failures it was found that an available acrylic, nylon or fibreglass reinforced nylon polymer had the required properties for the present invention. Best results have been obtained with an acrylic polymer sold by I.C.I. Plastic Division under the trade name Diakon. These acrylic polymers are formed easily and yet stand up to repeated use while maintaining relatively sharp cutting edges defining the letter shape and without undue breakage of the letters or cutting edges in normal use.

Preferably the letters are made of transparent plastic easily seen through to facilitate sorting and positioning with different colour tones being incorporated into the plastic used for the manufacture of stencil cutters having different types of numerals or letters. For example, Roman characters may be one colour, say, blue; Gothic characters another, say, orange; Hebrew characters another, say, green, etc.

Figure 1:
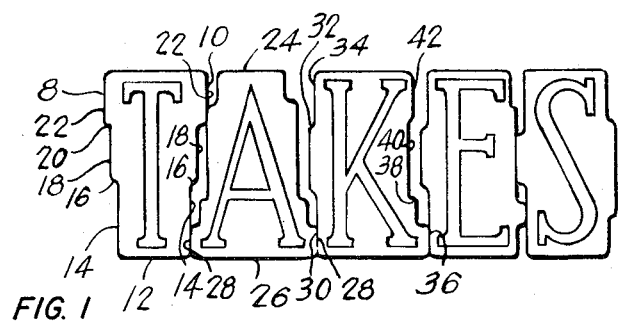
FIG. 1 is a plan view of a plurality of letters arranged in side-by-side relationship to cut a stencil when pressure is applied from above.
Figure 2:
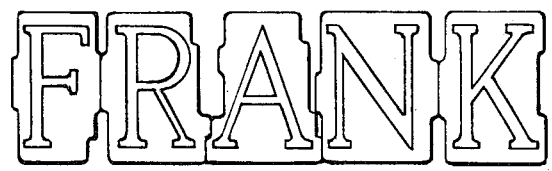
FIG. 2 is a view similar to FIG. 1 but illustrating a second set of letters in position to cut a stencil.

Referring now to FIGS. 1 and 2 it is immediately apparent that the opposite lateral sides of the various letters are different shapes depending on the specific letter on the stencil cutter. Each letter has stepped abutment faces which project laterally from the sides of the letter forms and are spaced vertically of the forms to provide abutment and positioning surfaces such as those to be described hereinbelow and illustrated at, for example, 14, 18, 22, 28, 30, 32, 34, 36, 38, 40, 42, etc.

The first letter in FIG. 1, namely the letter T is substantially symmetrical on opposite sides of its vertical axis, thus the opposite sides 8 and 10 are also symmetrical relative to said vertical axis. The base 12 of the letter is the narrowest and has lateral side wall member 14 projecting upward therefrom. A step 16 connects the abutment surface 14 with the next adjacent outward and upwardly spaced lateral abutment surface 18. A third abutment surface 22 is vertically and laterally outwardly spaced from surface 18 by step 20. The second letter A is also symmetrical and is formed with 4 symmetrical, vertical and laterally spaced abutment faces similar to the abutment faces on letter T but being narrowest at the top 24 and widest at the base 26. The base 26 has abutment surfaces 28 (the widest spaced abutment surfaces on the letter A) projecting up therefrom and these surfaces in the specific combination of letters illustrated abut against and cooperate with contiguous surfaces 14 and 30 of the letters T and K.

The letter K, unlike the letters T and A, is not symmetrical and thus the opposite sides of this letter have different series of steps. The forward side adjacent to the straight line section of the letter K has a single central laterally outward projecting abutment surface 32 spaced from the top and bottom of the letter by surfaces 30 and 34. The opposite side of the letter K is widest at the base as determined by the surface 36 and steps laterally inward to form two laterally inwardly and upwardly spaced surfaces 38 and 40. A surface 42 spaced upwardly and laterally outward of surface 30 connects surface 30 with the top of the letter form.

From the above description and from perusal of FIGS. 1 and 2 it is evident that the lateral sides of the various letters are stepped in accordance with the specific shapes of the letters to form a plurality of laterally and vertically spaced abutment surfaces. Commonly each letter is provided with three abutment surfaces on each lateral side. The stepped arrangement of abutment surfaces not only facilitates quick and accurate lateral positioning of the letters, but also permits the exact locating of all the letters in a complete stencil at one operation since the spacing for each cutting die is predetermined. Also, the thickness of the background of particular letters is modified to counteract the problem of flow under pressure of the flexible stencils in certain instances.

Figure 3:
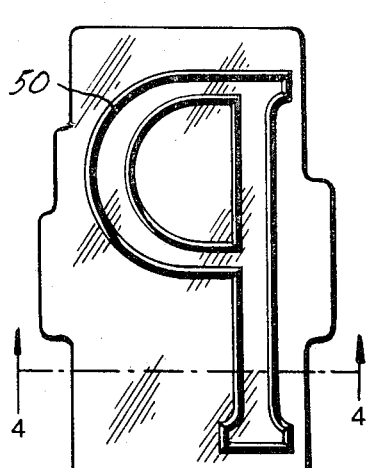
FIG. 3 is a plan view of a larger letter with its cutting edges facing upward.
Figure 5:
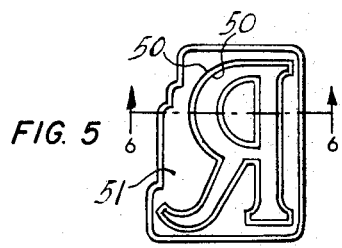
FIG. 5 is a plan view of a letter with cutting edges facing upward.
Figure 4:
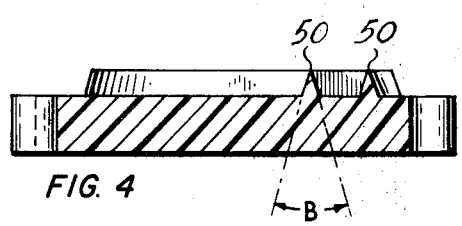
FIG. 4 is a sectional view along the line 4—4 of FIG. 3.
Figure 6:
FIG. 6 is a sectional view along the line 6—6 of FIG. 5.

In FIG. 3 the letter P of a larger set of letters has been illustrated with the cutting edges 50 defining the outline of the letter facing upward. FIG. 4, a section through the letter P of FIG. 3, illustrates the preferred shape of the cutting edges 50. It has been found that the included angle B between the planes that define the cutter itself must be in the range of 10°–14° and preferably should be 13° for best results. Applicant has found that by forming stencil cutting dies from an acrylic, nylon or fiberglass reinforced polymer and with cutters of included angle B in the above range the edges are sufficiently sharp and rugged to stand up to repeated use. In FIG. 5, a section through the letter R from a double outline Roman set illustrates the preferred modification of the increased background thickness of certain letters which tends to prevent breakage due to lateral flow of a stencil under pressure. FIG. 6, a section through the double outline Roman letter of FIG. 5 illustrates the preferred shape of the cutting edges 50 and the thickened background 51.

We claim:

1. A stencil cutter comprising: a form, bottom and top walls and stepped side walls on said form, said stepped side walls providing laterally and vertically spaced abutment surfaces from top to bottom along said side walls, a character defined on a front surface of said form by a pair of spaced cutting edges projecting outward from said front surface and integral with said form, said vertical and lateral spacing of said abutment surfaces being coordinated with the shape of said character to provide abutment surfaces which are adapted to contact adjacent abutment surfaces on adjacent forms when said form is used in co-operation with other forms.

2. A stencil cutter as defined in claim 1 wherein said form is molded from an acrylic polymer.

3. A stencil cutter as defined in claim 2 wherein said cutting edges are defined by surfaces having an included angle of 10° to 14° therebetween.

4. A stencil cutter as defined in claim 3 wherein said angle is 13°.

5. A stencil cutter as defined in claim 1 wherein the form is molded from a fiberglass reinforced polymer.

6. A stencil cutter as defined in claim 1 wherein the cutting edges define a double outline character on the front surface of the form, and wherein said front surface has a thicker background than that between the edges defining the double outline and has a thicker peripheral portion to prevent breakage of the cutting edges due to a lateral flow of stencil under pressure.

References Cited

UNITED STATES PATENTS

| | | | |
|---|---|---|---|
| 410,782 | 9/1889 | Casper | 30—178 X |
| 2,245,770 | 6/1941 | Franzmann | 30—315 X |
| 2,782,856 | 2/1957 | Staley | 30—363 |
| 2,876,714 | 3/1959 | Brown | 30—316 X |
| 3,284,899 | 11/1966 | Mercorelli | 30—363 X |

ROBERT C. RIORDON, Primary Examiner

J. C. PETERS, Assistant Examiner

U.S. Cl. X.R.

30—316; 83—691